United States Patent [19]

Hsu et al.

[11] Patent Number: 5,545,426
[45] Date of Patent: Aug. 13, 1996

[54] PRODUCTION OF PRODUCT SHEETS HAVING WAVED MARGINAL PORTIONS

[75] Inventors: Jau Y. Hsu, Brookfield; Thomas S. Orzech, New Milford, both of Conn.

[73] Assignee: Nestec S.A., Vevey, Switzerland

[21] Appl. No.: 408,141

[22] Filed: Mar. 20, 1995

Related U.S. Application Data

[60] Division of Ser. No. 250,039, May 27, 1994, Pat. No. 5,443,379, which is a continuation-in-part of Ser. No. 852,996, Mar. 13, 1992, abandoned.

[51] Int. Cl.$^6$ .................................................. A21C 11/00
[52] U.S. Cl. ........................... 426/496; 426/502; 426/512; 426/517; 426/451; 426/557; 425/335; 425/336; 425/367; 425/369; 264/175
[58] Field of Search ................................. 426/451, 496, 426/502, 512, 517, 549, 557; 425/327, 335, 336, 367, 369, 396, 363, DIG. 235; 264/175

[56] References Cited

U.S. PATENT DOCUMENTS

| | | | |
|---|---|---|---|
| 1,943,681 | 1/1934 | Lemmon | 425/336 X |
| 2,055,205 | 9/1936 | Pereyra | 425/363 X |
| 2,366,366 | 1/1945 | Souder | 426/557 |
| 2,539,356 | 1/1951 | Sidebotham | 154/31 |
| 2,686,720 | 8/1954 | Rosa | 426/144 |
| 2,713,313 | 7/1955 | Femina | 426/496 X |
| 3,299,837 | 1/1967 | Lind | 425/335 |
| 3,478,138 | 11/1969 | Friesner | 425/307 X |
| 3,576,051 | 4/1971 | Click et al. | 425/327 X |
| 3,669,585 | 6/1972 | Krupp | 425/327 X |
| 3,857,664 | 12/1974 | Johnson et al. | 425/327 |
| 4,028,031 | 6/1977 | Seide | 425/147 |
| 4,166,136 | 8/1979 | Stull | 426/451 X |
| 4,289,470 | 9/1981 | Johnston et al. | 425/336 |
| 4,499,040 | 2/1985 | Maemoto et al. | 264/167 |
| 4,559,005 | 12/1985 | Gants et al. | 425/363 |
| 4,614,632 | 9/1986 | Kezuka et al. | 264/280 |
| 4,717,328 | 1/1988 | D'Alterio | 425/290 |
| 4,732,638 | 3/1988 | Baker et al. | 156/358 |
| 4,780,329 | 10/1988 | D'Alterio | 426/451 X |
| 5,167,980 | 12/1992 | Herod et al. | 426/496 |
| 5,336,076 | 8/1994 | Waldherr et al. | 426/502 X |

Primary Examiner—Esther M. Kepplinger
Assistant Examiner—Milton I. Cano
Attorney, Agent, or Firm—Vogt & O'Donnell, LLP

[57] ABSTRACT

Sheet products having a waved marginal portion are prepared by passing a sheet of a plastic material through and compressing the sheet between shaped circumferential rollers which are positioned and configured to provide therebetween a plurality of differing nip clearance gap distances and to compress the sheet to form an intermediate sheet portion flanked by a marginal waved flanking portion and a second flanking portion, wherein the intermediate portion has a thickness greater than the second portion which, in turn, has a thickness greater than the marginal waved portion.

15 Claims, 3 Drawing Sheets

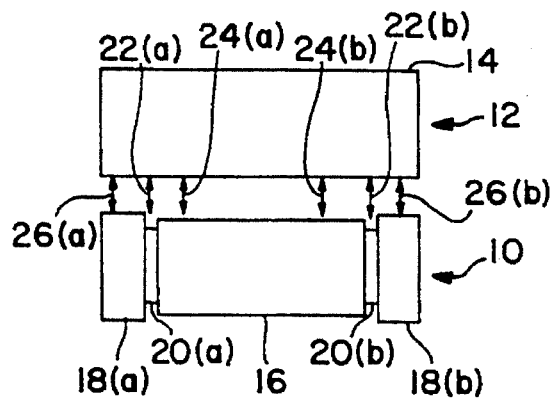
FIG. 1
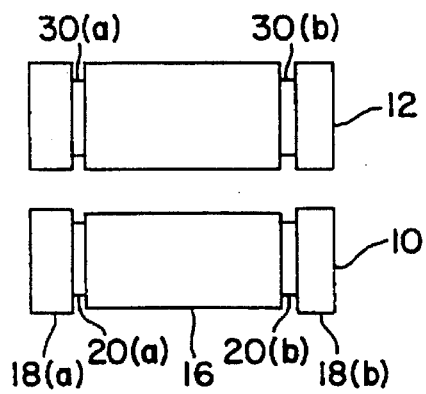
FIG. 2
FIG. 3
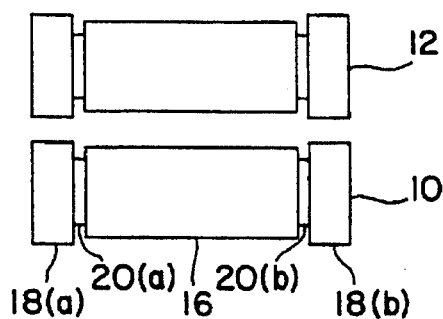
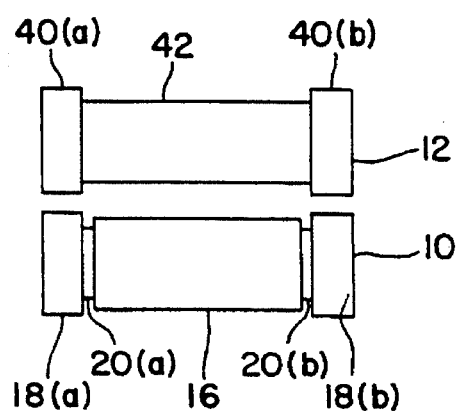
FIG. 4
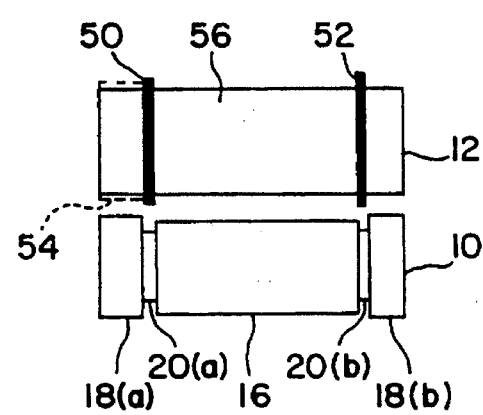
FIG. 5

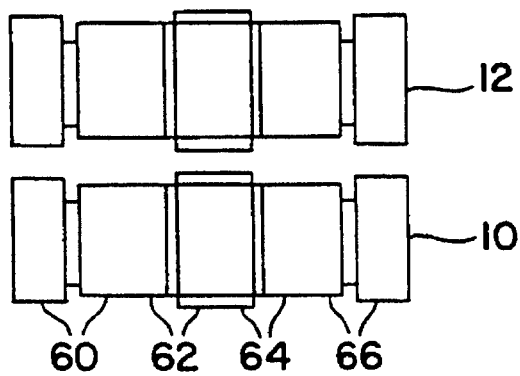
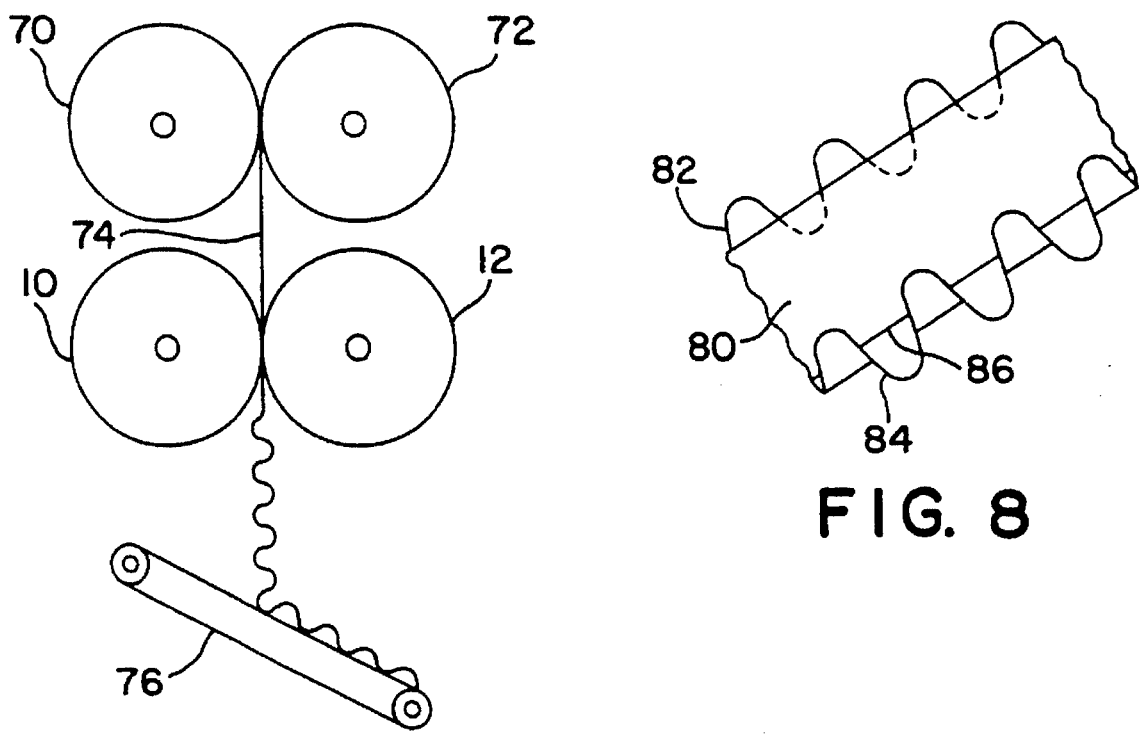

PRODUCTION OF PRODUCT SHEETS HAVING WAVED MARGINAL PORTIONS

CROSS REFERENCE TO RELATED APPLICATION

This application is a division application of application Ser. No. 08/250,039 which was filed May 27, 1994 and which is now U.S. Pat. No. 5,443,379 and which, in turn, was a continuation-in-part application of application Ser. No. 07/852,996, filed Mar. 13, 1992, now abandoned.

BACKGROUND OF THE INVENTION

The present invention relates to preparation of sheeted plastic articles having undulated, or waved, marginal portions.

Products formed from plastic and plasticizable materials, i.e., pliable and malleable materials which may be shaped and formed, to have undulated or waved marginal portions (hereinafter solely referred to as "waves" and "waved portions") are known to have been produced by extrusion techniques. Such products include food products such as sheets of farinaceous materials, including, illustratively, dough sheets employed for lasagna products. When employing extrusion techniques, the waves are created by an elongated slit die, i.e., extruder exit orifice, which has a narrower opening at its sides than in a central portion between two side marginal portions. Thus, the marginal portions of the extrudate flow from the die at a rate different from the flow rate of the central portion, thereby forming the two marginal portions in a wave form.

Additionally, U.S. Pat. No. 4,289,470 discloses a further means for preparing dough strips having waved marginal portions wherein the apparatus has a pair of rolls having marginal fluted portions which are positioned to mesh and crimp the marginal portions of a sheet of material passed between the rolls.

SUMMARY OF THE INVENTION

The present invention provides a process for production of a product sheet having a waved marginal portion wherein a sheet, i.e., a planar form, of plastic, i.e., malleable, material is passed to and between counter-rotating shaped circumferential surfaces having parallel longitudinal axes, hereinafter referred to as "wave-forming rollers", and at least a marginal portion of the sheet is compressed to displace material therefrom and so that an intermediate sheet portion is formed which is flanked by the compressed marginal sheet portion and by a second flanking sheet portion and which has a thickness greater than the flanking portions and so that the second flanking portion has a thickness greater than the marginal portion for, upon passage from between the surfaces, forming a waved marginal portion. Preferably, in carrying out the process of the invention, each flanking portion is compressed, the marginal flanking sheet portion being compressed to a thickness less than the second flanking portion.

Herein, the term "marginal" is used in its ordinary sense meaning an article edge and an area adjacent thereto, and as a result of the process, the marginal portion is formed into a waved configuration.

Also provided by the present invention is a process wherein the sheet passed through the wave-forming rollers has been formed by rolls, i.e., rolled sheet stock. Accordingly, the present invention also includes passing a plastic, i.e., malleable, material between counter-rotating circumferential surfaces, hereinafter "sheeting rollers", to form a sheet of plastic material, and then the sheet is passed to the wave-forming rollers for processing in accordance with the process set forth above. Preferably, the sheeting rollers from which the sheet to be treated by the wave-forming rollers emerges have a constant diameter, and preferably, the diameter of each sheeting roller is substantially the same. In practice of this embodiment, not only does the waved product produced have a structural stability substantially equivalent with a waved product produced by an extrusion process, but also, when processing amylaceous-/farinaceous-based, and particularly flour-based, material to produce such as a dough, the waved product produced in accordance with the present invention has a substantially more tender texture, and hence, better organoleptic properties, than a waved product produced by an extrusion process.

The present invention also provides an apparatus, which is useful for carrying out the wave-forming process described above, having a compression means comprising two circumferential surfaces, the wave-forming rollers, positioned and configured for having parallel longitudinal axes and forming therebetween an intermediate nip clearance gap portion flanked between a first flanking nip clearance gap portion and a second flanking nip clearance gap portion, wherein the gap distance of the intermediate nip portion is greater than the gap distance of the second nip portion and wherein the gap distance of the second nip portion is greater than the gap distance of the first nip portion. In the apparatus of the invention, means also are provided for adjusting the nip clearance gap distance, and means are provided for counter-rotating the roller surfaces.

Further included in the present invention is an apparatus arrangement of the wave-forming rollers and sheeting rollers.

DETAILED DESCRIPTION OF THE INVENTION

During our work to find an alternative to extrusion for preparing a product sheet having a waved marginal portion, it was discovered that employment of the nip clearance gap configuration described herein, including the intermediate nip clearance gap portion, is essential for obtaining a waved product which compares favorably in structural stability with a waved product obtained by extrusion.

As is known, and as is employed in the additional process embodiment noted above for making a sheet to be treated, roller surfaces having a constant nip clearance gap distance therebetween may be employed to compress and form plasticizable material into a material sheet. Our efforts to create waves on marginal portions of dough sheets included attempts which employed a pair of rollers configured to provide two adjacent differing roller nip clearance gap distances. To the extent this configuration enabled obtaining a product having marginal portions having at least a semblance of a wave-like character, the wave-form was not significantly pronounced, it exhibited structural stability significantly inferior to extruded waves, and importantly, when further processed by cooking for consumption, the wave character was lost.

Although not desiring to be bound by theory, it is believed that the present invention provides for production of, particularly in the case of processing amylaceous-/farinaceous-based, and particularly flour-based, materials, a product having a waved marginal portion in which the wave-form is structurally stable by reason of the intermediate portion storing energy of compression effected on the marginal portion during wave formation, thereby relieving material stress and reducing memory of the material of the waved marginal portion which would tend to cause the waves to return to the plane of the original sheet. Thus, the intermediate portion, which is adjacent the waved marginal portion and which is formed, generally, in a ridge- or rib-like configuration (hereinafter "rib"), pools material displaced from the marginal portion and stores energy effected by the marginal portion compression, and the compressed material tends to expand after compression substantially only in a direction of the thickness of the sheet.

In accordance with the present invention, the flanking and intermediate nip clearance gap portions of the apparatus are formed by the configuration of the circumferential surfaces of at least one of the pair of rollers. For convenience, one roller of the pair hereinafter is designated as the "primary" roller and the other roller is designated as the "counter" roller. Also in accordance with the invention, the pair of rollers is configured to provide, with reference to the intermediate nip clearance gap portion, at least one set of two flanking and one intermediate nip clearance gap portions which thereby provide, with reference from each intermediate portion, three adjacent nip clearance gaps of differing distance. In general, two sets of such clearance gaps are employed to provide for forming waves on the two longitudinally extending marginal portions of a longitudinally extending strip, and in this case, each set may be substantially coincident with end portions of the circumferential surfaces of the rollers. However, the surfaces may provide three or more sets and thus process a plurality of parallel strips.

On the other hand, product items, such as folded food products filled with an edible filling material, for example, may be made from sheets having only one waved marginal portion. In addition, decorative plastic products of pliable, malleable thermoplastic polymer resins advantageously may be prepared to have one or two waved marginal portions.

In one embodiment of the apparatus of the invention, only the primary roller need be shaped to provide the set or sets of differing nip clearance gap portions, the counter roller thereby having a constant diameter and thus, an even cylindrical surface. Thus, the primary roller is configured to have at least one set of two flanking portions and an intermediate portion, each portion being defined by differing outer roller surface diameters, thereby effecting, when paired in accordance with the invention, at least one set of three differing nip clearance gap distances between the primary and counter roller surfaces. Hence, the first flanking surface portion of the primary roller, which is employed together with the counter roller surface to define a marginal nip clearance gap portion, has a diameter greater than the second flanking portion, which is employed together with the counter roller surface to define the second flanking nip clearance gap portion, and each of these flanking portions has a diameter greater than a diameter of the surface portion therebetween, the intermediate portion.

In an alternative embodiment, the surfaces of both rollers are configured to contribute at least to defination of the intermediate nip clearance gap portion. Hence, one roller, the primary roller, may be provided with at least one set of flanking and intermediate portions and the other roller, the counter roller, is provided with a portion of reduced diameter positioned to be in alignment surface-to-surface with each intermediate portion of the primary roller. This embodiment is believed to provide for, with regard to the first embodiment above, greater stress reduction during formation of the waved product and hence, for production of a waved product having greater structural stability.

In addition, both rollers may be configured to have corresponding, or identical, sets of flanking and intermediate portions positioned so that like portions of each roller are in alignment surface-to-surface, which is believed to provide for an even greater combination of stress reduction and structural stability.

Alternatively, one roller, the primary roller, may be configured as described above to have at least two sets of flanking and intermediate portions, and the other roller, the counter roller, may be configured to have a portion of constant diameter which extends to flanking portions of greater diameter, the portion of constant diameter extending for a length which corresponds to the length of the second flanking and intermediate portions of the primary roller so that the counter roller flanking portions correspond with and are in alignment surface-to-surface with the first flanking portions of the primary roller.

In a further embodiment, the primary roller is configured, as described above, with at least one set of flanking and intermediate portions, and the counter roller has at least one portion which is of diameter greater than the remainder of the counter roller surface, and each such portion of greater diameter is configured and positioned to be in alignment surface-to-surface with an intermediate portion of the primary roller. Although this embodiment provides less stress reduction than the embodiments mentioned above, it has been found that this embodiment may be employed to achieve formation of a greater number of waves for a given linear distance than is achieved generally with other embodiments noted above. In this embodiment, although the remainder of the counter roller may be of a constant circumference, the counter roller surface portion which is adjacent the portion of greater diameter and which is in alignment surface-to-surface with the first flanking portion of the primary roller, may have a diameter greater than the remainder of the surface but less than the noted counter roller portion of greater diameter.

In the context of the present invention, the shaped surfaces which are employed to define and provide the differing nip clearance gap distances are smooth, and that term is intended to mean that the individual roller compression surface portions which form each of the flanking and intermediate portions are even and substantially free of irregularities. Further, in this context, the boundary surfaces between the individual roller surface portions which define the differing nip clearance gap distances are herein considered "smooth" even though such may form angles of or up to 90° or be otherwise curved.

The nip clearance gap distance between the pair of rollers at the second flanking portion surface should be no more than, and preferably is less than, a thickness of the sheet which is treated, the gap distance and the compression applied being at least sufficient so that material displaced by the compression of the marginal sheet portion is urged to form the intermediate sheet portion thickness. That is, the compression of the second nip clearance gap is at least sufficient to resist displaced marginal portion material from entering that region. Preferably, the second flanking nip clearance gap distance is a distance which is from, and thus compresses the sheet to a thickness of, about ⅓ to about ¾ of the thickness of the sheet treated. The flanking nip clearance gap distance defined by the first flanking portion, which is, in the practice of the process of the present invention, coincident with the sheet marginal portion for forming the marginal portion into waves, preferably ranges from, and thus compresses the sheet to a thickness of about 1/10 to about 1/2 of the second flanking nip clearance gap distance and thickness.

The intermediate roller portion is, preferably, in the context of dimensioning of the other elements, what may be deemed a "groove", i.e., a channel portion, this portion therefore being narrow relative to the roller surface width of the flanking portions. In the case of the primary roller having a groove and of the counter roller having a portion in alignment surface-to-surface with the groove which is of a diameter greater than the remainder of the counter roller, such may be deemed, in the context of the dimensioning of the rollers elements, a "ridge". The ridge should be dimensioned to have a width not larger than a width of the groove so that it is matable with the groove, i.e., a male-to-female relation, and if it is desired to engage the ridge into the groove, the ridge should be engageable in the groove without shearing or tearing the sheet being treated.

The intermediate groove portion should be of a depth and width sufficient to accomodate displaced material to reduce stress formed by the compression and to avoid tearing or shearing of the sheet. Preferably, the groove has a depth and width at least sufficient to accommodate therein at least the amount of the material displaced by the flanking roller portions, the displaced material generally being obtained primarily from material displaced by the first flanking portion. In general, the intermediate groove portion should have a depth at least equivalent to the second flanking nip clearance gap distance and a width at least sufficient to accommodate the displaced material, and as will be appreciated, the amount of material displaced may be calculated based upon the thickness and width of the material processed and the nip clearance gap distances of the flanking portions.

Although the intermediate roller portion groove may be sized to accept an amount of material so that the roller surfaces which define its depth and width provide support to the displaced material, it is preferred that the groove be sized to have a volume, as defined by its depth and width, somewhat greater than the volume amount of material displaced by the compression caused by the flanking roller portions. Although the material in the groove is subject to effects of compression by reason of material displacement, when processing in accordance with this embodiment configuration, such thereby reduces compression effects by the rollers per se upon the material in the groove, and as characterized herein, roller compression of the intermediate sheet portion, therefore, is "substantially avoided". Thus, grooves so configured therefore provide for maximizing receipt of the energy from the marginal portion subjected to the stress of compression, and hence, provide for better product wave structural integrity.

Illustratively, in the case of a dough sheet for preparing a pasta such as lasagna-type noodles, the thickness of the dough sheet may range from about 0.03 in. (about 0.76 mm) to about 0.70 in. (about 17.8 mm) and generally, from about 0.04 in. (about 1.02 mm) to about 0.06 in. (about 1.52 mm).

In such cases, the first flanking portion nip clearance gap distance may vary from about 0.005 in. (about 0.13 mm) to about 0.025 in. (about 0.635 mm), preferably from about 0.008 in. (about 0.203 mm) to about 0.02 in. (about 0.51 mm).

The second flanking hid clearance gap distance may vary from about 0.01 in. (about 0.25 mm) to about 0.05 in. (about 1.27 mm), preferably from about 0.02 in. (about 0.51 mm), to about 0.04 in. (about 1.02 mm). The difference in the clearance between the two flanking portions may be from about 0.001 in. (about 0.025 mm) to about 0.04 in. (about 1.02 mm), preferably from about 0.002 in. (about 0.051 mm) to about 0.02 in. (about 0.51 mm) and especially from about 0.005 in. (about 0.13 mm) to about 0.015 in. (about 0.38 mm).

The intermediate portion nip clearance gap distance may vary from about 0.040 in. (about 1.02 mm) to about 0.25 in. (about 6.35 mm), preferably, from about 0.10 in. (about 2.54 mm) to about 0.20 in. (about 5.08 mm). The width of the intermediate portion groove may be, conveniently, from about 0.020 in. (about 0.508 mm) to about 0.20 in. (about 5.08 mm) and preferably from about 0.05 in. (about 1.27 mm) to about 0.16 in. (about 4.06 mm). The depth of the groove should be on the order of from about 0.04 in. (about 1.02 mm) to about 0.2 in. (about 5.08 mm).

In general, a lasagna-type noodle dough sheet may have a width of about 3 in. (about 76.2 mm), and the sheet is passed through the rollers so that a marginal sheet portion having a width of preferably less than about 1 in. (about 2.54 cm) is contacted by the first flanking roller portion. Generally, in the case of lasagna-type noodles, as the width of the sheet marginal portion contacted is reduced below about 1 in. (about 2.54 cm), the better the wave formation. Most preferably, therefore, a sheen marginal portion having a width of from about 0.01 in. (about 2.54 mm) to about 0.75 in. (about 19.05 mm) is contacted by the first flanking portion. As will be appreciated, therefore, when it is desired to form waves on two marginal portions of a sheet of dough having a width as noted above, the two sets of roller portions are spaced apart with reference to the intermediate portions accordingly so that the two marginal portions treated have the dimensions noted above.

In general, when operating with a sheet having a thickness and width as noted above, the gap distances and the groove are provided to obtain a rib height, i.e., the height of a portion of the surface of the sheet formed by the intermediate groove portion which extends out of and above the plane of the surface formed by the second flanking portion, which ranges, preferably, from about 0.001 in. (about 0.025 mm) to about 0.04 in. (about 1.02 mm) and especially, from about 0.002 in. (about 0.05 mm) to about 0.03 in. (about 0.76 mm).

In general, as product rib height is increased by reason of changing the variables to effect the same, the number of waves produced for a given linear distance is increased and better structural stability, such as upon cooking for consumption, is realized. On the other hand, however, although employment of a roller surface-to-surface ridge and groove alignment embodiment may reduce product rib height/thickness, a waved product having structural stability equivalent with products having higher/thicker ribs may be obtained.

As will be appreciated, roller surfaces may be machine tooled readily to achieve the desired roller surface configurations, or such configurations may be formed by casting or molding rollers. The surfaces may be comprised of any of various ferrous or non-ferrous metals, including stainless steel, or alloys, or chromium plated-rolls, and plastic, as well as other industrial stock conventionally employed for rollers, may be employed, with the caveat that for preparation of food sheets, such should be recognized as being acceptable for food processing.

Roller driving means and the effecting of compression by the rollers may be accomplished with apparati assemblages and configurations known in the art of sheeting materials and known, in particular, for sheeting pasta products. Means, such as hydraulic or pneumatic means, for example, may be employed for adjusting the nip clearance gap for effecting compression, although a roller assemblage having a cam arrangement for gap adjustment, such as is manufactured by Toresani Mecchanich S.p.a. (Model SFA 140A; Type 84020) and as illustrated generally in the drawing Figures below, advantageously may be employed. In addition, upon the material being processed, the rollers may be heated or cooled to impact upon the malleability of the material.

In operation of the apparatus and process of the invention, even if each roller is configured to have a set or sets of flanking and intermediate portions which correspond surface-to-surface, the largest diameters of the primary and counter rollers, although not preferred, may be different. In any case, the rotational speeds of the rollers should be co-ordinated to effect peripheral, i.e., surface, speeds which reduce potential of sheet distortion, tearing, or shearing due to effects of friction and which minimize gaulling. Thus, although apparent surface speed will vary across the end-to-end extent of the rollers because of the differences of diameter between the various portions, a somewhat different surface speed of one roller relative to the other may be found to be useful to minimize sheet stress. In general, diameters of the rollers conveniently may range from about 2 in. (5.08 cm) to about 4 in. (10.16 cm), and surface speeds on the order of from about 5 ft/min. (1.524 μm/min.) to about 10 ft/min. (3.048 μm/min.) may be employed.

Although a sheet to be treated in accordance with the present wave-forming invention may be formed by extrusion through a die, as indicated above, in the case of food products, it is preferred that the sheet be formed by rolling a dough mass into a form of a sheet. Waved product formation, in accordance with the invention, from a sheet prepared by rolling provides a waved product having not only an appearance and structural stability comparable to an extruded waved product, but also the advantage, as compared with extrusion, of production of a waved product having a substantially more palatable texture, the product being, in particular, more tender due to, it is believed, a more gentle processing history. Preparation of the waved sheet may be integrated with a process of sheet formation, or the waved sheet may be prepared from sheet stock, preferably rolled stock, previously prepared.

Rolled sheets may be prepared by any of various manners of rolling known in the art including by apparati manufactured by Toresani, as noted above. In the case of food products, the material to be sheeted may be prepared, for example, from amylaceous/farinaceous materials, particularly flours, conventionally employed to make bakery and pasta products particularly from Durum flour, and including but not limited to, for example, processed or whole wheat flour, and from native and pre-gelatinized rice flour, and from corn and potato flours, native and pregelatinized, and from pea flour and soy flour and from farina and from combinations thereof. Doughs may be prepared by kneading as is conventional and known in the art, and the sheeting may be effected by a plurality of pairs of rolls aligned in series.

Other ingredients which may be employed in the preparation of a dough include those employed in pasta products including, but not limited to, for example, protein materials such as, for example, whole egg, egg white, egg yolk, whey protein concentrate and soy protein isolate, starch-complexing agents such as, for example, glyceryl monostearate, gums such as, for example, sodium alginate and propylene glycol alginate, and vegetable materials such as, for example, spinach, carrot and tomato. Vegetables, fresh or dehydrated, such as, in particular, spinach or tomato, also may be added for flavoring and coloring purposes. Incorporation of wheat gluten also is advantageous, particularly in fresh and refrigerated pastas, for inhibiting starch retrogradation.

The moisture content of the sheet to be waved should be, generally, on the order of from about 28% to about 34% by weight based on the weight of the sheet material. As is conventional, the moisture may be from water added in addition to that inherently contained in the materials processed. Should the sheet to be waved be stored on a spindle or arbor prior to processing, storage humidity should be sufficient to prevent surface drying, and humidity during wave-forming processing also desirably is maintained at a level to avoid surface drying.

When a waved pasta-type product, such as lasagna, is prepared in accordance with the invention, it may be presented as a chilled fresh pasta, preferably pasteurized, before chilling. Pasteurization may be effected, for example, by such as steaming about 88° C. to about 99° C. for from about 20 sec. to about 50 sec., and chilling temperatures may be for from about −2° C. to about +10° C.

Alternatively, the waved pasta product may be processed further by any of various means conventional in the art, including such as dehydration, or cooking wholly or partially with water or steam, and cooking with means of microwaves, and combinations thereof. Dehydration may be effected in a humidity dryer, for example, for a period of from about 4 hours to about 10 hours at a temperature of from about 50° C. to about 65° C. and about 70% to about 85% humidity, or may be effected in a hot air drier at from about 80° C. to about 150° C. for about 10 minutes to about 2 hours. A waved raw or dehydrated pasta may be prepared for consumption by cooking in such as boiling water for from about 1 minute to about 6 minutes. Alternatively, the pasta may be fully cooked and frozen.

To further illustrate the present invention, description is provided below with reference, by way of example, to the accompanying drawing Figures.

BRIEF DESCRIPTION OF THE DRAWINGS

FIGS. 1–6 illustrate diagrammatically roller pairs configured for preparing a waved product in accordance with the present invention.

FIG. 7 illustrates diagrammatically an apparatus assembly for forming a waved product in accordance with the present invention.

FIG. 8 illustrates a perspective view of a product having marginal waved portions.

DETAILED DESCRIPTION OF THE DRAWINGS

Figure 9:
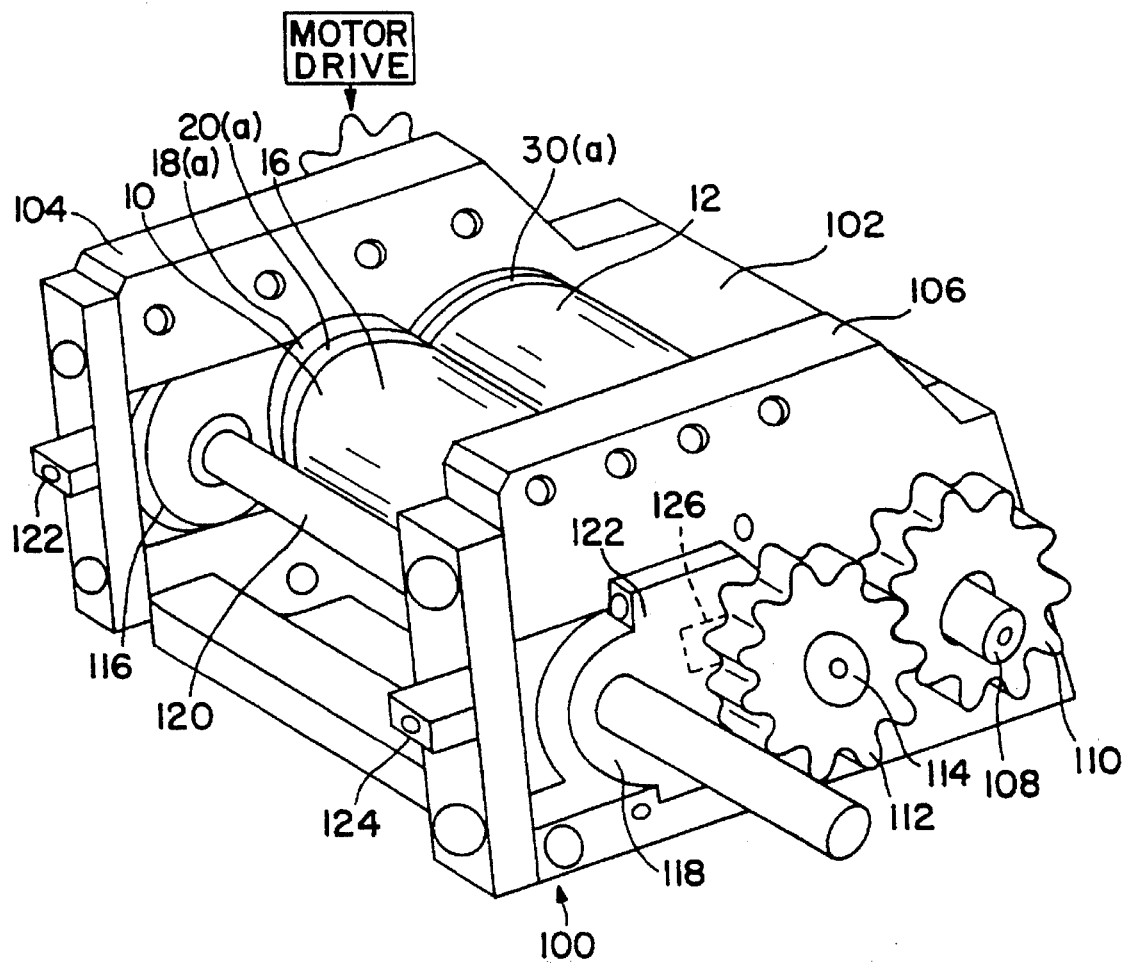
FIG. 9 illustrates a perspective view of an apparatus assembly for forming a waved product in accordance with the present invention.

FIGS. 1–6 illustrate diagrammatically a pair of rollers having circumferential surfaces wherein the primary roller referred to above is designated generally by reference numeral 10, and the counter roller referred to above is designated generally by reference numeral 12. In addition, unless otherwise indicated, like reference numerals in different drawing Figures are intended to designate like elements, and as will be appreciated from the foregoing and following descriptions and from the drawing Figures, the illustrations are not drawn to scale.

As illustrated in FIG. 1, counter roller 12 has an even surface 24 of constant diameter. Primary roller 10 is profiled and provides, as also defined by transverse boundary surfaces, a distinct central surface portion 16, marginal surface portions 18(a) and 18(b), and intermediate groove portions 20(a) and 20(b) positioned between the central and marginal surface portions. Thus, as illustrated, the diameters of marginal surface portions 18(a) and (b) are greater than that of central surface portion 16 which, in turn, has a diameter greater than the diameter of the surface portions defining grooves 20(a) and (b).

As illustrated in FIG. 1, the rollers employed for passing a material therethrough and compressing at least a marginal portion thereof provide two sets of flanking and intermediate portions, one set being formed by the surface portions designated 18(a), 20(a) and 16 and the second set being formed by the surface portions designated 18(b), 20(b) and 16, central surface portion 16 providing the definition for each set of what has been referred to above as the second flanking portion.

Likewise, with reference to the two rollers of FIG. 1, one intermediate nip clearance gap portion, designated by double arrow 22(a), is flanked between a second flanking nip clearance gap portion, designated by double arrow 24(a) and a marginal nip clearance gap portion, designated by double arrow 26(a). A second intermediate nip clearance gap portion 22(b) is flanked between a second flanking nip clearance gap portion 24(b) and a marginal flanking nip clearance gap portion 26(b). Although the invention should not be deemed to be restricted to such, all FIG. 1 suffix (a) and (b) roller portions and nip clearance gaps having like reference numerals are intended to be illustrated as being equivalent in diameter and distance, respectively.

For treatment of two marginal portions of a sheet of a plastic material, rollers 10 and 12 of FIG. 1 are counter-rotated, and a sheet passed between the rollers is subjected to compression at least by passage through nip clearance gaps 26(a) and (b). By reason of the compression, some material is urged from nip clearance gaps 26(a) and (b), thereby thinning the marginal sheet portions to some extent, to intermediate nip clearance gaps 22(a) and (b) and to groove portions 20(a) and (b), and the marginal portions also are lengthened relative to the remainder of the sheet.

Preferably, as indicated also by the references to dimensioning above, the operational gap distances also are such that compression force is applied by the second flanking portions formed by roller portion 16 at least to resist a tendency of material to pass from the marginal flanking portions through intermediate clearance gap portions and past grooves 20(a) and (b) into second flanking nip clearance gap portions 24(a) and (b), thereby assisting in pooling displaced material in the grooves and in forming a rib in the sheet at a position coincident with the intermediate portion grooves. As indicated above, grooves 20(a) and (b) preferably have a volume and the compressive forces applied preferably are such that the entirety of the grooves are not completely filled by material displaced by the marginal and second flanking portions.

In addition, as will be appreciated, a sheet passed through the rollers of FIG. 1 which is of a size such that it engages only one-half of the width of the rollers, for example, will be formed to have only one waved marginal portion.

As illustrated in FIG. 2, primary roller 10 is configured as in FIG. 1, and counter roller 12 is configured to have groove portions 30(a) and 30(b) of reduced roller diameter, the remainder of the roller being of constant diameter. Each of groove portions 30(a) and 30(b), and their transverse boundaries, are positioned to be in alignment surface-to-surface with one intermediate groove, 20(a) and 20(b) and their transverse boundaries, respectively, of primary roller 10. As will be appreciated, depending upon the extent of compression of a sheet passed between the rollers, grooves 20(a) and (b) and 30(a) and (b) will tend to cause formation of a rib on each surface side of the product which, as indicated above, is believed to be advantageous for minimizing sheet stress and for enhancing structural stability of the waves which, when formed by this embodiment, extend on either side of a plane formed by the central portion of the waved sheet.

FIG. 3 is intended to illustrate each roller as being dimensioned and configured identically, and like flanking and intermediate portions of each roller, and the transverse boundaries thereof, are in alignment surface-to-surface. Thus, each distinct surface-to-surface aligned roller portion of the rollers illustrated in FIG. 3 may present substantially equivalent force on either side of the plane of the sheet for forming waves. Likewise, a rib is formed on each surface side which aids structural stability, and as indicated above, it is believed that this embodiment is most advantageous for minimizing sheet stress since surface speed differentials, as compared with other embodiments are minimized, which thereby also minimizes tendencies for gaulling and for sheet surface imperfections.

FIG. 4 illustrates a primary roller 10, which is configured as in FIGS. 1–3, and a counter roller 12 configured to have marginal flanking portions 40(a) and 40(b) in alignment surface-to-surface with marginal portions 18(a) and 18(b) and to have a central portion 42 which extends for the length of intermediate groove portions 20(a) and (b) and flanking central portion 16.

FIG. 5 illustrates primary roller 10, which is configured as in the prior Figures, and counter roller 12 having a pair of circumferential ridges 50 and 52 positioned in alignment surface-to-surface to fit within the transverse boundaries of grooves 20(a) and (b), respectively, of primary roller 10. As an alternative, the portions adjacent the ridges which are in alignment surface-to-surface with primary roller surfaces 18(a) and (b) may have, as indicated by the dashed drawing line designated by reference numeral 54, a diameter greater than central portion 56, but less than the ridges.

FIG. 6 illustrates a modification of the embodiment of FIG. 3 which provides for treating at least two sheets side-by-side by reason of providing four sets of roller portions 60, 52, 54 and 66.

FIG. 7 illustrates an embodiment of the invention which includes rollers 70 and 72, which may be considered as sheet-forming rollers or as guide rollers. Rollers 70 and 72 are positioned to direct sheet 74 vertically downward to wave forming rollers 10 and 12 which, in turn, feed the treated waved-sheet to conveyor 76, preferably a variable speed conveyor, the upper conveying run surface of which is depicted as being at an angle to the horizontal. As will be appreciated, vertical feeding of the sheet to the wave forming rollers results in less stress on the sheet than would be the case with horizontal feeding, and hence, feeding the sheet so that it extends vertically upon feeding to the wave-forming rollers is preferred.

FIG. 8 is illustrative of a sheet, designated by reference numeral 80, produced in accordance with the invention having waved marginal portions 82 and 84 and having ridges/ribs designated by reference numeral 86.

FIG. 9 is illustrative of a Toresani-type cam-adjustable apparatus as referred to above, the apparatus being modified to enable carrying out the present invention by employment of rollers configured in accordance with the invention as described above. The apparatus, generally designated by reference numeral 100, has its members assembled with a supporting frame 102, rollers 10 and 12 being positioned between frame members 104 and 106.

A drive means (labeled box), preferably of variable speed, may be connected directly to drive shaft 108 or indirectly to the shaft with the aid of a gear sprocket (not shown) to drive gear sprocket 110 which is secured to shaft 108 to which roller 12 is secured. Gear sprocket 112 is secured to shaft 114 which, in turn, is secured to roller 10, each of gear sprockets 110 and 112 being of a size sufficient and configured to mesh relative to a particular range of roller clearance gap distances.

For adjustment of nip clearance gap distance, cam assemblies having holding and bearing plate assemblies 116 and 118 connected by red 120 are provided to position shaft 114 and hence, roller 10. Adjustment of the positioning may be made with cam pins 122 and 124, and the cam assemblies include a spring return designated by the dotted lines indicated with reference numeral 126.

EXAMPLES

The following examples further illustrate the present invention. Parts and percentages are given by weight and the linear measurements in the Tables are given in inches. For forming the sheets to be waved, a mixture of 74% of Durum flour, 15% of whole egg and 11% of additional water is kneaded and then passed through sheeting rollers. For forming the waved product, dough sheets are treated with an apparatus as illustrated in drawing FIG. 9. The rollers are operated to have a surface speed of about 7.7 ft/min., and with respect to grooves in the rollers, the sheets treated have a marginal portion of about 1 inch. The roller grooves have a width of 0.085 in. and a depth of 0.052 in.

Examples 1–6

Six pasta sheets having thicknesses ranging progressively in increments of 0.05 in. from 0.45 to 0.70 in. are prepared. Each of the six sheets is passed through a pair of wave-forming rollers configured as illustrated in FIG. 1. The wave-forming rollers provide a second nip clearance gap distance of 0.021 in. and a marginal nip clearance gap of 0.017 in. After treatment, the waved sheets are cooked by boiling in water for 3 minutes. The number of waves after cooking, as set forth in Table 1 below, are the number per 10 in.

TABLE 1

| Initial sheet thickness | Uncooked second flank portion thickness | Uncooked marginal portion thickness | Uncooked rib height | Cooked rib height | Waves No. after cooking |
|---|---|---|---|---|---|
| 0.070 | 0.045 | 0.031 | 0.023 | 0.027 | 13 |
| 0.065 | 0.042 | 0.032 | 0.018 | 0.017 | 12 |
| 0.060 | 0.042 | 0.033 | 0.016 | 0.011 | 12 |
| 0.055 | 0.041 | 0.032 | 0.009 | 0.004 | 11 |
| 0.050 | 0.040 | 0.032 | 0.010 | 0.002 | 11 |
| 0.045 | 0.040 | 0.031 | 0.003 | 0.003 | 11 |

In addition, after cooking, the thickness of the second flank pasta portion is in a range from 0.050 in. to 0.055 in., and the marginal portion thickness is in a range of from 0.042 in. to 0.043 in.

As illustrated by Table 1, the waved products which have higher rib height have more waves for a given linear distance formed and retained after cooking.

Examples 7–10

Each of four dough sheet samples having a thickness of 0.072 in. is passed through a pair of rollers configured as illustrated in FIG. 1. Each sheet is treated with a marginal portion nip clearance gap distance of 0.015 in., but the second flanking nip clearance gap distance, as shown in Table 2, is changed for processing each of the sheet samples.

TABLE 2

| Ex. | Second flank nip clearance gap distance | Sheet second flanking portion thickness | Sheet marginal portion thickness | Waves-No. per 10 inches |
|---|---|---|---|---|
| 7 | 0.022 | 0.044 | 0.028 | 14 |
| 8 | 0.030 | 0.056 | 0.028 | 12 |
| 9 | 0.040 | 0.060 | 0.031 | 9 |
| 10 | 0.050 | 0.070 | 0.031 | 8 |

The results of these experiments show that a reduction of the second flanking hid clearance gap distance results in an increase in the height of the dough sheet rib and an increase in the number of waves formed for a given linear distance.

Example 11 and Comparative Example

One marginal portion of a dough sheet having a thickness of 0.070 in. is treated with rollers configured so that the second flank portion has a nip clearance gap distance of 0.021 and so that the marginal flank nip clearance gap distance is 0.009 which, upon treatment, provides marginal portion sample A. The opposing marginal portion of the sheet is treated with the rollers configured so that one roller has a surface of constant diameter and the other roller has a groove between portions of constant diameter, the nip clearance between the portions flanking the groove being the same, a distance of 0.021 in. which provides, upon treatment, marginal sample portion B. The product so treated is cooked for three minutes in boiling water, and marginal portion A of the cooked product has 15 waves per 10 inches and marginal portion B of the cooked product does not have discernable waves.

Examples 12≧17

Two sets of dough sheets, each set having three dough sheets of different thickness, as shown in Table 3 below, are passed through FIG. 1 type wave-forming rollers, wherein the second flank hid clearance gap distance is 0.023 in. The marginal nip clearance gap distance for experiments 12–14 is 0.015 in. and for experiments 15–17, the marginal nip clearance gap distance is 0.017 in. The waved products then are cooked by boiling in water for 3 minutes.

TABLE 3

| Ex. | Initial dough sheet thickness | Waved product Waves-No. per 10 inches | Cooked product Waves-No. per 10 inches |
| --- | --- | --- | --- |
| 12 | 0.060 | 13 | 14 |
| 13 | 0.057 | 21 | 20 |
| 14 | 0.055 | 18 | 18 |
| 15 | 0.060 | 10 | 9 |
| 16 | 0.057 | 6 | 7 |
| 17 | 0.055 | 10 | 10 |

Example 18

A dough sheet having a thickness of 0.057 in. is passed through a pair of wave-forming rollers configured to have a roller with a ridge as in FIG. 5. The second flank nip clearance gap distance is 0.023 in., and the marginal nip clearance gap distance is 0.013 in., the height and width of the ridge of the counter roller being less than the depth and width of the groove of the primary roller.

The waved product sheet, which has a second flank portion thickness of 0.041, a marginal portion thickness of 0.033, a ridge/rib height of 0.008, has 10 waves per 10 in. The waved product then is boiled in water for 3 minutes. The boiled product, which has a second flank portion thickness of 0.052 in., a marginal flank portion of 0.042 in., and a ridge height of 0.009 in., has 12 waves per 10 in.

The presence of the circumferential ridges on the counter roller aligned with the grooves on the primary roller produces satisfactory marginal waves and upon cooking, more waves are exhibited.

As should be clear from the foregoing, various modifications of the present invention may be made without departure from the broader spirit and scope of the disclosure, and the invention may be embodied and/or practiced suitably in the absence and/or to the exclusion of elements or members and/or process steps not specifically disclosed herein.

We claim:

1. A process for production of a product sheet having a waved marginal portion comprising the steps of passing a sheet of a plastic material to and between two counter-rotating surfaces shaped so that there are a plurality of differing nip clearance gaps therebetween and during passage between the counter-rotating surfaces, compressing at least a marginal portion of the sheet with the counter-rotating surfaces to displace material from the marginal portion to form sheet portions which comprise a compressed marginal portion, a second portion and an intermediate portion, which is flanked by the compressed marginal portion and the second portion, so that the intermediate portion has a thickness greater than the marginal and second portions and the second portion has a thickness greater than the marginal portion for, upon passage from between the counter-rotating surfaces, forming a waved marginal portion.

2. A process according to claim 1 wherein the counter-rotating surfaces compress the second portion in an amount at least sufficient so that material displaced from the marginal portion is urged to form the intermediate portion.

3. A process according to claim 1 wherein during passage between the counter-rotating surfaces, surface compression of the intermediate portion is substantially avoided.

4. A process according to claim 1 wherein the counter-rotating surfaces compress the second portion to a thickness of from about ⅓ to about ¾ of a thickness of the sheet passed to the surfaces and wherein the counter-rotating surfaces compress the marginal portion to a thickness of from about ¹⁄₁₀ to about ½ of the compressed thickness of the second portion.

5. A process according to claim 1 wherein the plastic material is a flour-based dough material.

6. A process according to claim 1 further comprising passing a plastic material between additional counter-rotating circumferential surfaces for forming the sheet and then passing the sheet to and between the counter-rotating surfaces.

7. A process according to claim 6 wherein the plastic material is a flour-based dough material.

8. A process according to claim 6 wherein the plastic material is a flour-based dough material.

9. A process according to claim 6 wherein the sheet is passed vertically to, between and from the counter-rotating surfaces.

10. A process according to claim 1 wherein the sheet is passed vertically to, between and from the counter-rotating surfaces.

11. A process according to claim 1 wherein the plastic material is a flour-based dough material and further comprising avoiding surface-drying of the sheet passed to the counter-rotating surfaces.

12. A process according to claim 1 wherein the sheet is compressed so that the intermediate portion forms a rib on each surface side of the product.

13. A process according to claim 1 wherein the two counter-rotating surfaces rotate at differing surface speeds.

14. A process according to claim 1 wherein the counter-rotating surfaces compress the second portion of the sheet to a reduced thickness.

15. A process according to claim 1 wherein two marginal sheet portions are compressed to form two intermediate portions each flanked by one compressed marginal portion and one second portion for forming a sheet having two waved marginal portions.

* * * * *